(12) United States Patent
Shimizu et al.

(10) Patent No.: US 6,477,283 B1
(45) Date of Patent: Nov. 5, 2002

(54) ELECTROABSORPTION OPTICAL MODULATOR AND FABRICATION METHOD THEREOF

(75) Inventors: Junichi Shimizu; Yuji Furushima, both of Tokyo (JP)

(73) Assignee: NEC Corporation, Tokyo (JP)

( * ) Notice: Subject to any disclaimer, the term of this patent is extended or adjusted under 35 U.S.C. 154(b) by 181 days.

(21) Appl. No.: 09/611,902

(22) Filed: Jul. 7, 2000

(30) Foreign Application Priority Data

Jul. 12, 1999 (JP) .......................................... 11-198008

(51) Int. Cl.[7] .............................................. G02F 1/035
(52) U.S. Cl. .......................................................... 385/3
(58) Field of Search ................................. 385/2–12, 13, 385/1, 131; 257/276, 370, 371, 377, 379; 438/31, 1, 30, 619, 234, 294, 207, 359, 210, 226

(56) References Cited

U.S. PATENT DOCUMENTS

| 4,802,182 A | * | 1/1989 | Thornton et al. .............. 372/26 |
| 5,108,945 A | * | 4/1992 | Matthews .......... 148/DIG. 136 |
| 5,112,761 A | * | 5/1992 | Matthews ..................... 257/370 |
| 5,132,237 A | * | 7/1992 | Matthews ....................... 438/1 |
| 5,134,083 A | * | 7/1992 | Matthews ............ 148/DIG. 19 |
| 5,171,713 A | * | 12/1992 | Matthews ............ 148/DIG. 20 |
| 5,182,225 A | * | 1/1993 | Matthews ..................... 257/276 |
| 5,728,605 A | * | 3/1998 | Mizutani ...................... 372/45 |
| 5,889,913 A | * | 3/1999 | Tohyama et al. ............ 385/131 |
| 5,901,265 A | * | 5/1999 | Tohyama et al. ............ 385/131 |
| 6,374,001 B1 | * | 4/2002 | Bozeat et al. ................ 385/131 |

FOREIGN PATENT DOCUMENTS

| JP | 6-222406 | 8/1994 |
| JP | 10-90635 | 4/1998 |

* cited by examiner

Primary Examiner—Akm E. Ullah
(74) Attorney, Agent, or Firm—Scully, Scott, Murphy & Presser

(57) ABSTRACT

An impurity diffusion preventing layer is provided between a first upper clad layer adjacent to an optical absorption layer and a second upper clad layer provided on the first upper clad layer in order to prevent p type impurity from diffusing to the first upper clad layer adjacent to the optical absorption layer.

10 Claims, 6 Drawing Sheets

ELECTROABSORPTION OPTICAL MODULATOR AND FABRICATION METHOD THEREOF

BACKGROUND OF THE INVENTION

1. Field of the Invention

The present invention relates to a semiconductor optical modulator, which is an important element in an optical communication or an optical information processing system, and, particularly, to a semiconductor electroabsorption optical modulator, in which electroabsorption rate is changed by applying an electric field thereto, and a fabrication method for fabricating the same semiconductor electroabsorption optical modulator.

2. Description of the Prior Art

In an optical modulator, which is a key device in an optical communication system whose bit rate and communication distance are increased more and more recently, specifically, an electroabsorption type optical modulator, which utilizes a phenomenon that the optical absorption edge of a semiconductor material is shifted toward a long wavelength side upon application of an electric field, a multiple quantum well (MQW) layer is usually used as an optical absorption layer, as shown in FIG. 1.

The optical modulator shown in FIG. 1 has a striped multi-layered structure including an n type InP buffer layer 2, an n type InGaAsP optical guide layer 3, an n type InP clad layer 4, a non-doped MQW optical absorption layer 5 formed by alternately laminating InGaAsP well layers and InGaAsP barrier layers, a p type InGaAsP clad layer 6 and a p type InP clad layer 8, which are formed on an n type InP substrate in the order.

Semi-insulating InP burying layers 9 are formed on both sides of the multi-layered structure and a p$^+$InP clad layer 10 and a p$^+$InGaAs contact layer 11 are further formed on the semi-insulating InP burying layer 9 and the p type InP clad layer 8.

In the optical modulator having such structure, optical ON/OFF ratio (extinction ratio) per unit voltage application is large since the MQW layer is used as the optical absorption layer. However, there may be diffusion of p type impurity from the p$^+$InGaAs contact layer 11 and the p$^+$InP clad layer 10 on the optical absorption layer 5 to the InGaAsP clad layer 6 adjacent to the optical absorption layer 5, during a fabrication thereof. Therefore, strength of electric field applied to the optical absorption layer 5 becomes large in a portion of the optical absorption layer 5, so that electric field strength distribution in the optical absorption layer becomes uneven. Since the degree of absorption in the electroabsorption type optical modulator depends on square of electric field strength, the extinction ratio characteristics with respect to applied voltage becomes non-linear as shown by a curve 52 in FIG. 5 when there is an unevenness of electric field strength within the optical absorption layer.

Therefore, when a high speed modulation higher than 2.5Gb/s is performed, cross points of eye pattern, which is a modulated waveform, are lowered as shown in FIG. 6B, so that there is a problem that an acceptable eye opening can not be obtained.

SUMMARY OF THE INVENTION

An object of the present invention is to provide an electroabsorption type optical modulator capable of preventing impurity from diffusing to a vicinity of an optical absorption layer thereof and maintaining cross points in an ideal state and a fabrication method for fabricating the same electroabsorption type optical modulator.

An electroabsorption optical modulator according to the present invention, which includes a striped waveguide constructed with a multi-layered structure, in which an optical absorption layer is sandwiched between clad layers having band gap energy larger than that of the optical absorption layer, formed on a semiconductor substrate, so that absorption of light incident on one edge of the optical absorption layer is changed by changing strength of electric field applied to the optical absorption layer, is featured by that, between a first upper clad layer adjacent to an upper surface of the optical absorption layer and a second upper clad layer, an impurity diffusion preventing layer for preventing p type impurity from diffusing from the second upper clad layer and a semiconductor layer provided above the second upper clad layer to the first upper clad layer is provided.

When the impurity diffusion preventing layer is a semiconductor layer with carrier concentration lower than that of the second upper clad layer and p type impurity diffusion speed is lower than that of the first upper clad layer, the impurity diffusion preventing effect thereof becomes considerable. Furthermore, it is preferable that the waveguide has a multi-layered structure constructed by laminating an optical guide layer of a first conductivity type, a lower clad layer of the first conductivity type having band gap energy larger than that of the optical guide layer, an MQW optical absorption layer having band gap energy smaller than that of the optical guide layer, a first upper clad layer of a second conductivity type having band gap energy smaller than that of the lower clad layer, an impurity diffusion preventing layer of the second conductivity type having carrier concentration lower than that of the first clad layer and a second upper clad layer of the second conductivity type having band gap energy larger than that of the first upper clad layer and carrier concentration higher than that of the impurity diffusion preventing layer, in the order.

Moreover, when the striped waveguide is buried by high resistance semiconductor layers provided on both sides thereof, light confinement efficiency thereof becomes excellent, resulting in high modulation efficiency.

Furthermore, in the electroabsorption type optical modulator according to the present invention, it is preferable to that the semiconductor substrate, the lower clad layer, the impurity diffusion preventing layer and the second upper clad layer are formed of InP, the optical guide layer is formed of InGaAsP, the optical absorption layer is of InGaAsP MQW and the first upper clad layer is formed of InGaAsP.

The fabrication method for fabricating the electroabsorption type optical modulator, according to the present invention, is featured by comprising the step of forming, on a semiconductor substrate of a first conductivity type, a multi-layered structure by sequentially forming at least a lower clad layer of the first conductivity type, a non-doped optical absorption layer having band gap energy smaller than that of the lower clad layer, a first upper clad layer having band gap energy larger than that of the optical absorption layer and smaller than that of the lower clad layer, an impurity diffusion preventing layer of a second conductivity type having band gap energy larger than that of the first clad layer and carrier concentration lower than that of the first upper clad layer and a second upper clad layer having band gap energy larger than that of the first upper clad layer and carrier concentration higher than that of the impurity diffusion preventing layer, the step of forming a waveguide having a striped multi-layered structure by etching the multi-layered structure, the step of forming a burying layer of high resistance semiconductor on both sides of the waveguide and the step of forming, on at least the waveguide, a semiconductor layer of the second conductivity type having carrier concentration higher than that of the second upper clad layer.

A second fabrication method for fabricating the electro-absorption type optical modulator according to the present invention is featured by comprising the steps of forming a mask of dielectric material having a striped opening on a semiconductor substrate of a first conductivity type, forming a waveguide having a striped multi-layered structure by sequentially forming, on the opening of the mask by selective growth, at least a lower clad layer of the first conductivity type, a non-doped optical absorption layer having band gap energy smaller than that of the lower clad layer, a first upper clad layer having band gap energy larger than that of the optical absorption layer and smaller than that of the lower clad layer, an impurity diffusion preventing layer of a second conductivity type having band gap energy larger than that of the first clad layer and carrier concentration lower than that of the first upper clad layer and a second upper clad layer having band gap energy larger than that of the first upper clad layer and carrier concentration higher than that of the impurity diffusion preventing layer, forming a burying layer of high resistance semiconductor on both sides of the waveguide by selective growth and forming, on at least the waveguide, a semiconductor layer of the second conductivity type having carrier concentration higher than that of the second upper clad layer.

In the above two fabrication methods, the waveguide preferably includes an optical guide layer of the first conductivity type having band gap energy smaller than that of the lower clad layer of the first conductivity type and larger than that of the optical absorption layer below the lower clad layer.

Moreover, it is preferable that the semiconductor substrate, the lower clad layer, the impurity diffusion preventing layer and the second upper clad layer are formed of InP, the optical guide layer is formed of InGaAsP, the optical absorption layer is of InGaAsP MQW and the first upper clad layer is formed of InGaAsP.

Furthermore, in view of the impurity diffusion prevention, it is preferable to reduce the growing time or the growing temperature of the semiconductor layer formed after the waveguide is formed, that is, to reduce the growing time or the growing temperature of the burying layer and the semiconductor layer formed on the waveguide.

BRIEF DESCRIPTION OF THE DRAWINGS

This above-mentioned and other objects, features and advantages of the present invention will become more apparent by reference to the following detailed description of the invention taken in conjunction with the accompanying drawings, in which.

DETAILED DESCRIPTION OF THE PREFERRED EMBODIMENTS

First Embodiment

An embodiment of the present invention will be described with reference to FIGS. 2 and 3A to 3E.

Figure 3A:
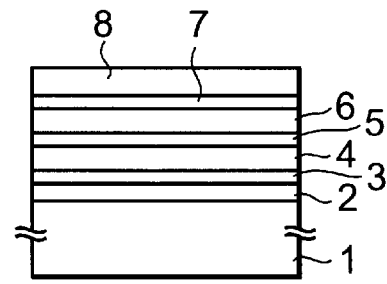
FIGS. 3A to 3E show fabrication steps of the optical modulator, according to the first embodiment of the present invention.

As shown in FIG. 3A, on an n type (100) InP substrate 1, an n type InP buffer layer 2 having carrier concentration of $1 \times 10^{18}$ cm$^{-3}$ and thickness of 0.8 μm, an n type InGaAsP optical guide layer 3 having band gap wavelength of 1.13 μm, an n type InP clad layer 4 having carrier concentration of $5 \times 10^{17}$ cm$^{-3}$ and thickness of 0.59 μm, an MQW optical absorption layer 5 composed of alternately laminated nine InGaAsP well layers each 7nm thick and having band gap wavelength of 1.55 μm and 10 ten InGaAsP barrier layers each 5.2nm thick and having band gap wavelength of 1.2 μm, a p type InGaAsP clad layer 6 having carrier concentration of $5 \times 10^{17}$ cm$^{-3}$, band gap wavelength of 1.05 μm and thickness of 0.5 μm, a p type InP impurity diffusion preventing layer 7 having carrier concentration of $2 \times 10^{17}$ cm$^{-3}$ and thickness of 0.1 μm and a p type InP clad layer 8 having carrier concentration of $5 \times 10^{17}$ cm$^{-3}$ and thickness of 0.5 μm are grown sequentially in the order by metal organic vapor phase epitaxy (MOVPE) using trimethyl indium (TMIn), triethyl gallium (TEGa), diethyl zinc (DEZn), arsine (AsH$_3$), phosphine (PH$_3$) and disilane (Si$_2$H$_6$) as raw materials under conditions of growing temperature of 625° C. and growing pressure of 10hPa, resulting in a multi-layered structure. The impurity diffusion preventing layer 7 may have a carrier concentration ranging from $8 \times 10^{16}$ cm$^{-3}$ to $7 \times 10^{17}$ cm$^{-3}$.

Figure 3B:
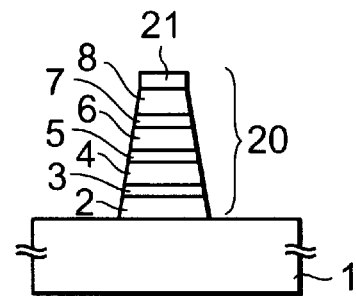

Then, as shown in FIG. 3B, a SiO$_2$ film is deposited on a whole surface of the p type InP clad layer 8 by thermal CVD and a SiO$_2$ mask 21 having a striped pattern 1.5 μm wide is formed by using usual photolithography. Thereafter, the multi-layered structure is etched up to the n type InP substrate 1 by reactive ion beam etching (RIBE) method to form a waveguide 20 having a striped multi-layered structure. In this case, the etching of the multi-layered structure may be made up to a middle of the buffer layer 2.

Figure 3C:
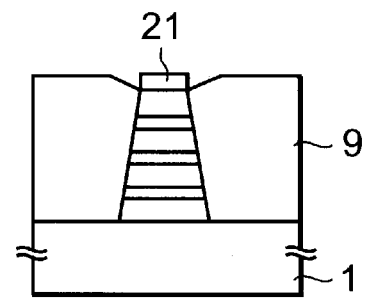

Then, as shown in FIG. 3C, the striped waveguide 20 is buried by semi-insulating InP burying layers 9 having thickness as large as a height of the striped waveguide 20 and formed on both sides of the striped waveguide 20 by MOVPE while the SiO$_2$ mask 21 on an upper portion of the waveguide 20 being left as it is.

Figure 3D:
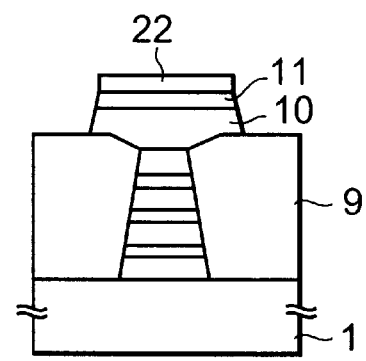

Then, as shown in FIG. 3D, the SiO$_2$ mask 21 on an upper portion of the waveguide 20 is removed and, then, a p$^+$ type InP clad layer 10 having carrier concentration of $1 \times 10^{18}$ cm$^{-3}$ and thickness of 1 μm and a p$^+$type InGaAs contact layer 11 having carrier concentration of $1 \times 10^{19}$ cm$^{-3}$ and thickness of 0.2 μm are grown on whole surfaces of the InP clad layer 8 and the semi-insulating InP burying layer 9 by MOVPE. On a region of the p$^+$type InGaAs contact layer 11, corresponding to an immediate above portion of the striped waveguide, a striped SiO$_2$ mask 22 is formed by photolithography and, then, the p$^+$ type InGaAs contact layer 11 and the p$^+$ type InP clad layer 10 are removed by chemical etching to form a striped p$^+$ type InP clad layer 10 and p$^+$type InGaAs contact layer 11 immediately above the waveguide.

Figure 3E:
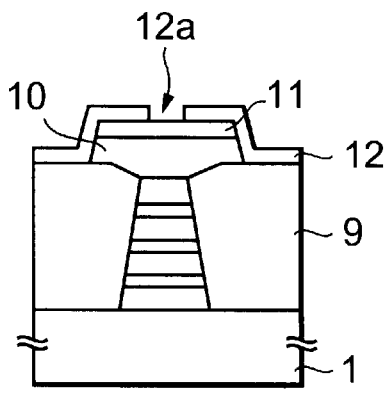

Then, as shown in FIG. 3E, after the striped $SiO_2$ mask 22 on the $p^+$type InGaAs contact layer 11 is removed, a $SiO_2$ protective layer 12 is deposited on a whole surface of the wafer by thermal CVD. Then, a portion of the $SiO_2$ protective layer 12, which includes the immediate above portion of the waveguide, is removed by usual photolithography to form a striped opening 12a in the $SiO_2$ protective layer 12.

Figure 1:
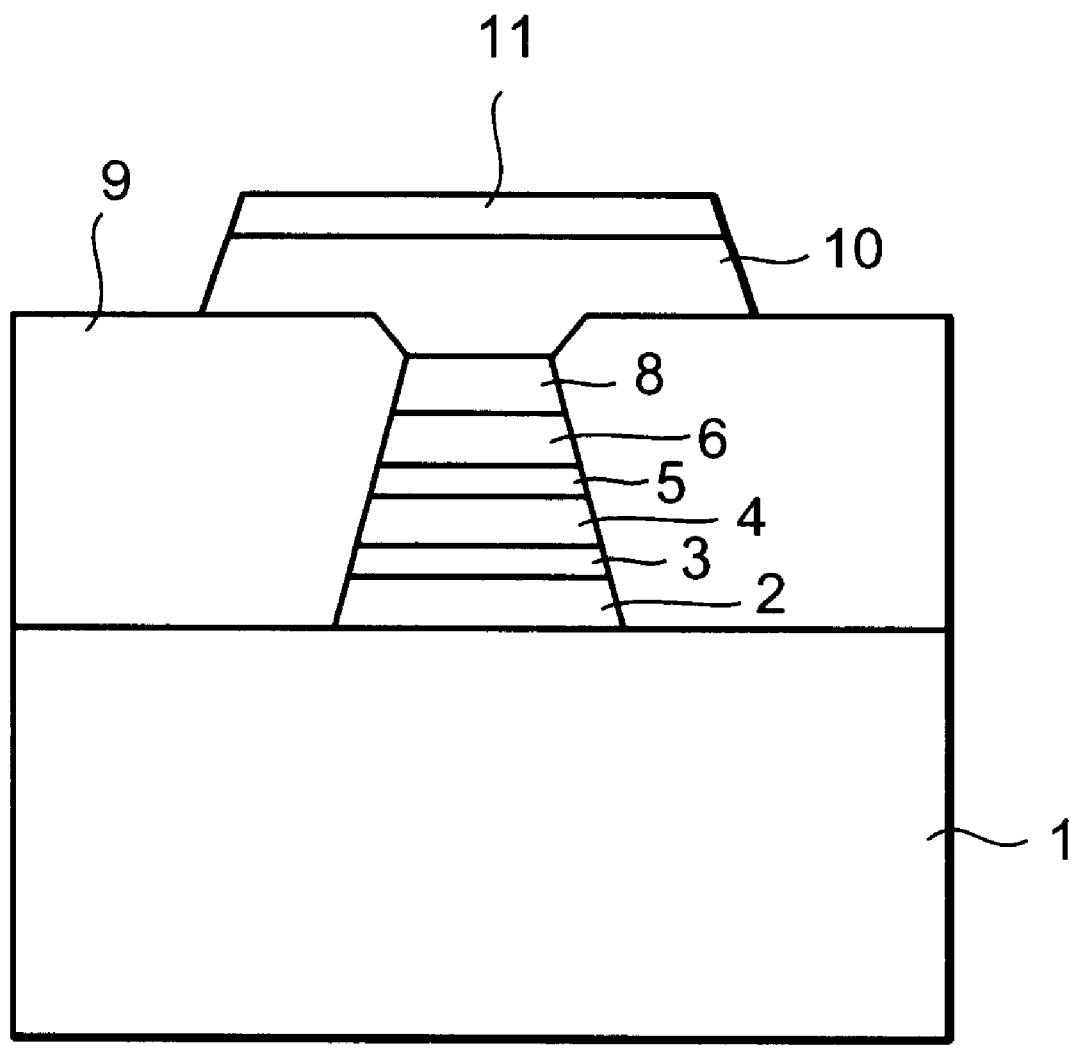
FIG. 1 is a cross section of a conventional optical modulator.
Figure 2:
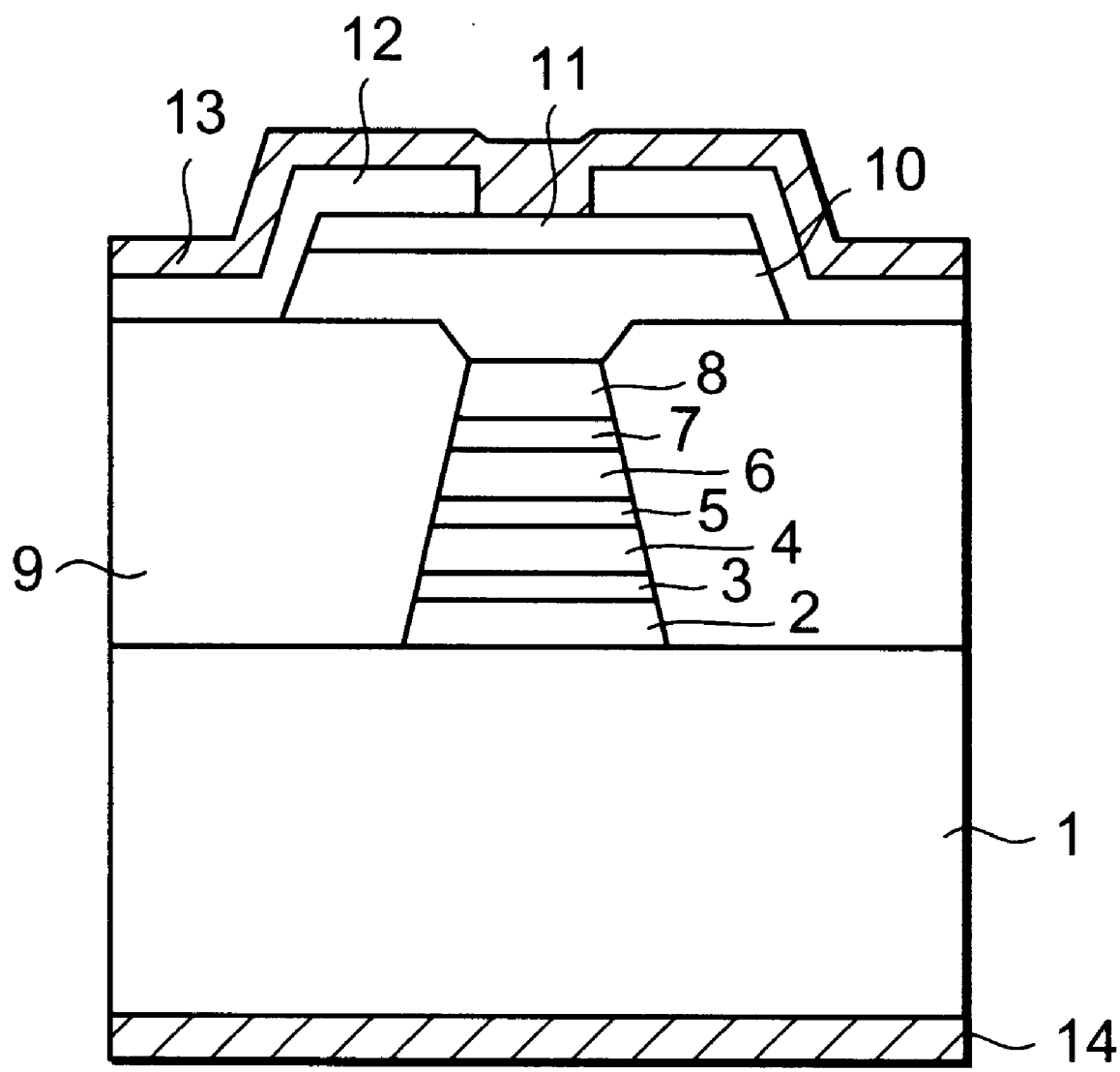
FIG. 2 is a cross section of an optical modulator according to an embodiment of the present invention.

After a surface electrode 13 is vapor deposited on a whole surface of the wafer, an electrode pattern is formed by using usual photolithography. Finally, the InP substrate 1 is polished up to an appropriate thickness and the electroabsorption type optical modulator shown in FIG. 2 is completed by forming an electrode 14 on a rear surface of the InP substrate 1.

Opposite edge faces of the optical modulator thus fabricated were coated with films each having reflectivity of 0.1% and the characteristics thereof was evaluated. The extinction characteristics of the optical modulator measured by inputting a laser light from a distributed feedback (DFB) laser having oscillation wavelength of 1.550 $\mu$m thereto is shown by a curve 51 in FIG. 5. As is clear from FIG. 5, the non-linearity of the extinction characteristics is improved. Further, the non-return-to-zero (NRZ) modulation waveform at 10Gb/s was measured. A result is shown in FIG. 6A. As is clear from FIG. 6A, it is clear that the cross point position is improved.

Second Embodiment

A second embodiment of the fabrication method of the present optical modulator is shown in FIGS. 4A to 4E. The second embodiment will be described with reference to FIGS. 2 and 4A to 4E.

Figure 4A:
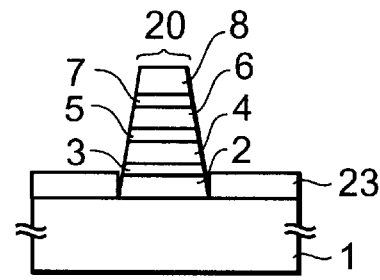
FIGS. 4A to 4E shows fabrication steps of the optical modulator, according to the second embodiment of the present invention.

As shown in FIG. 4A, a $SiO_2$ film 100 nm thick is deposited on an n type (100) InP substrate 1 by thermal CVD and a $SiO_2$ mask 23 is formed by patterning the $SiO_2$ film such that a striped opening extends in [011] direction of the InP substrate. Width of the opening of the mask 23 was 1.5 $\mu$m in this case. Then, an n type InP buffer layer 2 having carrier concentration of $1\times10^{18}$ cm$^{-3}$ and thickness of 0.8 $\mu$m, an n type InGaAsP optical guide layer 3 having band gap wavelength of 1.13 $\mu$m, an n type InP clad layer 4 having carrier concentration of $5\times10^{17}$ cm$^{-3}$ and thickness of 0.5 $\mu$m, an MQW optical absorption layer 5 composed of alternately laminated nine InGaAsP well layers each 7nm thick and having band gap wavelength of 1.55 $\mu$m and ten InGaAsP barrier layers each 5.2nm thick and having band gap wavelength of 1.2 $\mu$m, a p type InGaAsP clad layer 6 having carrier concentration of $5\times10^{17}$ cm$^{-3}$, band gap wavelength of 1.05 $\mu$m and thickness of 0.5 $\mu$m, a p type InP impurity diffusion preventing layer 7 having carrier concentration of $2\times10^{17}$ cm$^{-3}$ and thickness of 0.1 $\mu$m and a p type InP clad layer 8 having carrier concentration of $5\times10^{17}$ cm$^{-3}$ and thickness of 0.5 $\mu$m are grown selectively and sequentially in the order on the opening portion of the $SiO_2$ mask 23 by MOVPE using trimethyl indium (TMIn), triethyl gallium (TEGa), diethyl zinc (DEZn), arsine ($AsH_3$), phosphine ($PH_3$), bis-cyclopentadienyl iron (ferrocene) and disilane ($Si_2H_6$) as raw materials under conditions of growing temperature of 625° C. and growing pressure of 100hPa, resulting in a striped waveguide 20 having a multi-layered structure.

Figure 4B:
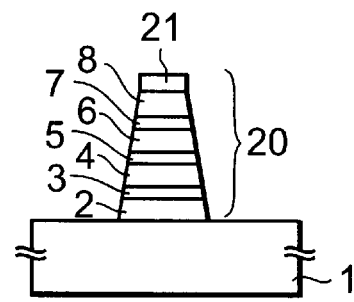

Then, as shown in FIG. 4B, a $SiO_2$ mask 21 is formed on only the waveguide by thermal CVD and photolithography after the $SiO_2$ mask 23 is removed.

Figure 4C:
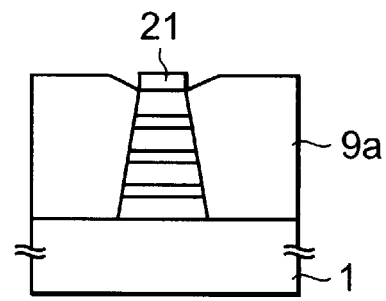

Thereafter, as shown in FIG. 4C, the striped waveguide 20 is buried by Fe doped high resistance burying layers 9a having thickness substantially the same as height of the striped waveguide 20 grown on both sides of the striped waveguide 20 by MOVPE with using the $SiO_2$ mask 21 as a selective growing mask.

Figure 4D:
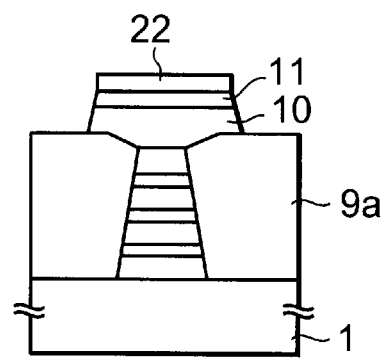

Then, as shown in FIG. 4D, the $SiO_2$ mask 21 on the waveguide 20 is removed and, then, a $p^+$ type InP clad layer 10 having carrier concentration of $1\times10^{18}$ cm$^{-3}$ and thickness of 1 $\mu$m and a $p^+$type InGaAs contact layer 11 having carrier concentration of $1\times10^{19}$ cm$^{-3}$ and thickness of 0.2 $\mu$m are grown on whole surfaces of the InP clad layer 8 and the high resistance InP burying layers 9a by MOVPE. On a region of the $p^+$ type InGaAs contact layer 11, corresponding to an immediate above portion of the striped waveguide, a striped $SiO_2$ mask 22 is formed by photolithography and, then, the $p^+$ type InGaAs contact layer 11 and the $p^+$ type InP clad layer 10 are removed by chemical etching to making the $p^+$ type InP clad layer 10 and the $p^+$ type InGaAs contact layer 11 immediately above the waveguide as striped.

Figure 4E:
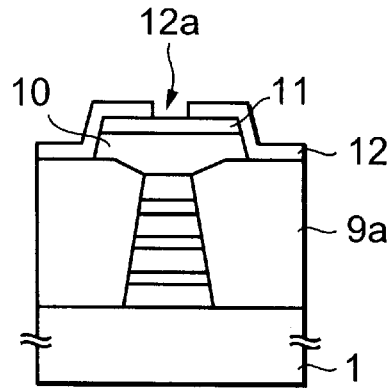

Then, as shown in FIG. 4E, after the striped $SiO_2$ mask 22 on the $p^+$ type InGaAs contact layer 11 is removed, a $SiO_2$ protective layer 12 is deposited on a whole surface of the wafer by thermal CVD. Then, a portion of the $SiO_2$ protective layer 12, which includes the immediate above portion of the waveguide, is removed by usual photolithography to form a striped opening 12a in the $SiO_2$ protective layer 12.

After a surface electrode 13 is vapor deposited on a whole surface of the wafer, an electrode pattern is formed by using usual photolithography. Finally, the InP substrate 1 is polished up to an appropriate depth and the electroabsorption type optical modulator shown in FIG. 2 is completed by forming an electrode 14 on a rear surface of the InP substrate 1.

Although, in any of the described embodiments, the buffer layer 2 is formed on the substrate, the buffer layer 2 may be omitted. Furthermore, the optical guide layer 3 may be also omitted. Moreover, although the burying layers 9 (9a) are selectively grown after the striped waveguide 20 having the multi-layered structure is formed, it may be possible that, after a burying layer is formed on the substrate, a groove is formed in the burying layer by etching and, then, the waveguide is formed in the groove by selective growing. In the latter case, the impurity diffusion preventing effect may be superior than those obtained by the described embodiments since the number of the heating steps (crystal growing steps) after the formation of the waveguide is smaller than that of any of the described embodiments by one.

In the electroabsorption type optical modulator of the present invention, as is disclosed in the foregoing description, the impurity diffusion preventing layer 7 of $p^-$ type InP having low carrier concentration is provided between the p type InGaAsP clad layer 6 and the p type InP clad layer 8 on the MQW optical absorption layer. Furthermore, the diffusion speed of Zn is highest in InGaAs, and lowest in InP, that in InGaAsP being in between. Therefore, diffusion of Zn, which is a p type impurity of the p type InP clad layer 8, the $p^+$ type InP clad layer 10 and the $p^+$ type InGaAs contact layer 11 on the $p^-$ type InP impurity diffusion preventing layer 7, to the p type InGaAsP clad layer 6 adjacent to the MQW optical absorption layer 5 is prevented by the $p^-$type InP impurity diffusion preventing layer 7.

Figure 5:
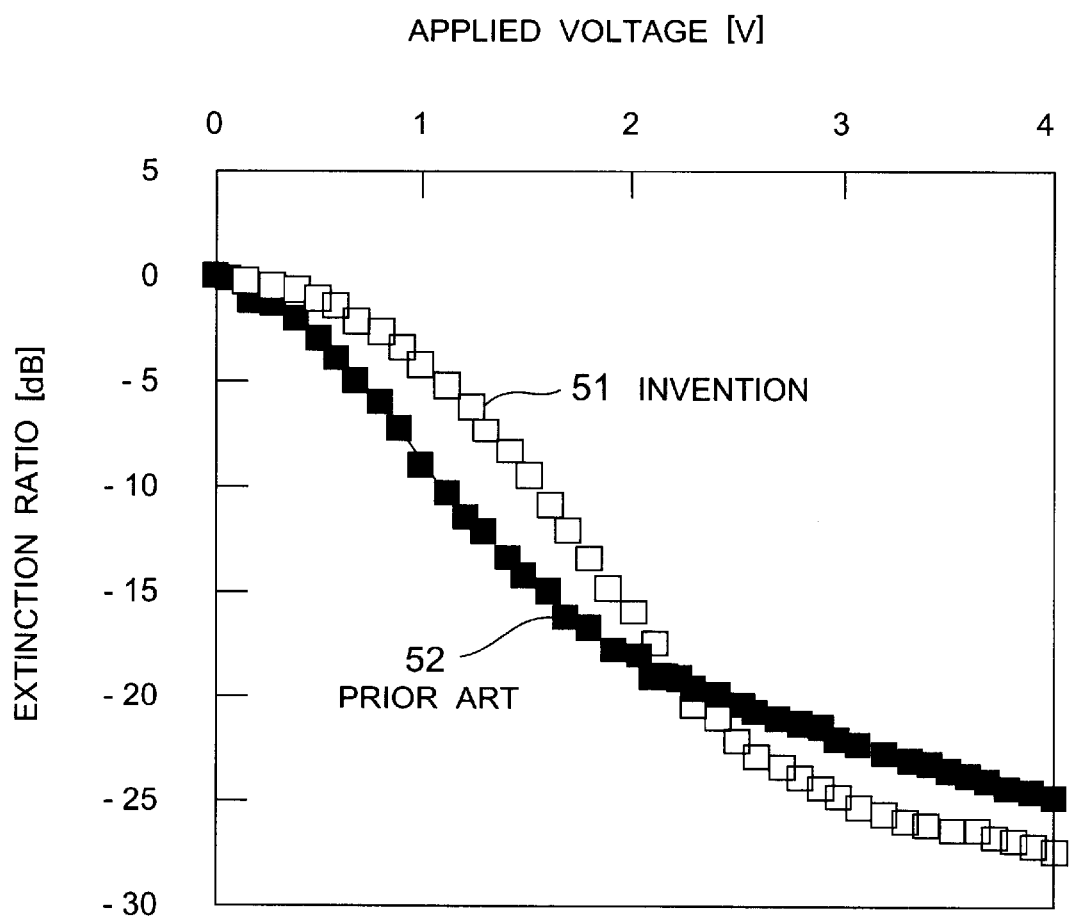
FIG. 5 shows the extinction characteristics of the conventional optical modulator and the present optical modulator.
Figure 6A:
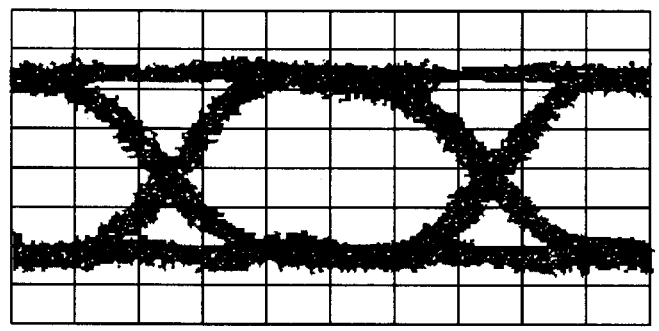
FIGS. 6A and 6B show modulation waveforms under NRZ modulation of the conventional and present optical modulators.
Figure 6B:
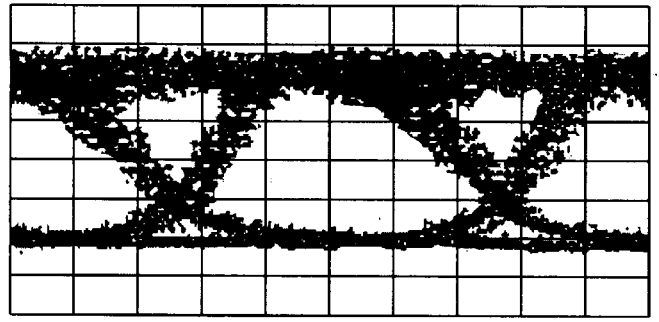

As a result, unevenness of electric field strength applied to the optical absorption is removed as shown by the extinction characteristics curve 51 in FIG. 5 and the modulation waveform is improved in cross point position as shown in FIG. 6A. Furthermore, the improvement of the cross point position corresponds to shorting of the rising time tr and the falling time tf of the optical signal waveform. Therefore, the modulation speed of the optical modulator is improved.

Although the invention has been described with reference to specific embodiments, this description is not meant to be construed in a limiting sense. Various modifications of the disclosed embodiments will become apparent to persons skilled in the art upon reference to the description of the invention. It is, therefore, contemplated that the appended claims will cover any modifications or embodiments as fall within the true scope of the invention.

What is claimed is:

1. An electroabsorption type optical modulator comprising: a striped waveguide constructed with a multi-layered structure formed on a semiconductor substrate such that an optical absorption layer is sandwiched between clad layers having band gap energy larger than that of said optical absorption layer, so that absorption of light incident on one edge of said optical absorption layer is changed by changing strength of electric field applied to said optical absorption layer; an impurity diffusion preventing layer provided between a first upper clad layer adjacent to an upper surface of said optical absorption layer and a second upper clad layer, said impurity diffusion preventing layer being adapted to prevent p type impurity from diffusing from said second upper clad layer; and a semiconductor layer provided above said second upper clad layer to said first upper clad layer.

2. An electroabsorption type optical modulator as claimed in claim 1, wherein said impurity diffusion preventing layer is constructed with a semiconductor layer, a diffusion speed of the p type impurity in said semiconductor layer being lower than that in said first upper clad layer and carrier concentration of said semiconductor layer being lower than that of said second upper clad layer.

3. An electroabsorption type optical modulator as claimed in claim 1, wherein said waveguide has a multi-layered structure comprising:

an optical guide layer of a first conductivity type;

a lower clad layer of the first conductivity type having band gap energy larger than that of said optical guide layer;

a multiple quantum well optical absorption layer having band gap energy smaller than that of said optical guide layer;

said first upper clad layer of a second conductivity type having band gap energy smaller than that of said lower clad layer;

said impurity diffusion preventing layer of the second conductivity type having carrier concentration lower than that of said first clad layer; and said second upper clad layer of the second conductivity type having band gap energy larger than that of said first upper clad layer and carrier concentration higher than that of said impurity diffusion preventing layer, in the order.

4. An electroabsorption type optical modulator as claimed in claim 3, further comprising high resistance semiconductor layers on both sides of said striped waveguide, said waveguide being buried by said high resistance semiconductor layers.

5. An electroabsorption type optical modulator as claimed in claim 4, wherein said semiconductor substrate, said lower clad layer, said impurity diffusion preventing layer and said second upper clad layer are formed of InP, said optical guide layer is formed of InGaAsP, said optical absorption layer is of InGaAsP MQW and said first upper clad layer is formed of InGaAsP.

6. A fabrication method for fabricating an electroabsorption type optical modulator formed on a semiconductor substrate of a first conductivity type, comprising the step of:

forming a waveguide having a striped multi-layered structure including a lamination of at least a lower clad layer of the first conductivity type, a non-doped optical absorption layer having band gap energy smaller than that of said lower clad layer, a first upper clad layer having band gap energy larger than that of said optical absorption layer and smaller than that of said lower clad layer, an impurity diffusion preventing layer of a second conductivity type having band gap energy larger than that of said first clad layer and carrier concentration lower than that of said first upper clad layer and a second upper clad layer having band gap energy larger than that of said first upper clad layer and carrier concentration higher than that of said impurity diffusion preventing layer;

forming burying layers of high resistance semiconductor on both sides of said waveguide; and forming, on at least said waveguide, a semiconductor layer of the second conductivity type having carrier concentration higher than that of said second upper clad layer.

7. A fabrication method for fabricating an electroabsorption type optical modulator as claimed in claim 6, wherein said striped multi-layered structure is formed by etching said lamination.

8. A fabrication method for fabricating an electroabsorption type optical modulator as claimed in claim 6, wherein said striped multi-layered structure is formed by the steps of:

forming a mask of dielectric material having a striped opening on said semiconductor substrate of the first conductivity type; and selectively growing said lamination in said opening of said mask.

9. A fabrication method for fabricating an electroabsorption type optical modulator as claimed in claim 6, wherein said striped multi-layered waveguide further comprises an optical guide layer of the first conductivity type provided below said lower clad layer of the first conductivity type, said optical guide layer having band gap energy smaller than that of said lower clad layer of the first conductivity type and larger than that of said optical absorption layer.

10. A fabrication method for fabricating an electroabsorption type optical modulator as claimed in claim 9, wherein said semiconductor substrate, said lower clad layer, said impurity diffusion preventing layer and said second upper clad layer are formed of InP, said optical guide layer is formed of InGaAsP, said optical absorption layer is of InGaAsP MQW and said first upper clad layer is formed of InGaAsP.

* * * * *